United States Patent [19]

Kelley

[11] Patent Number: 4,878,050
[45] Date of Patent: Oct. 31, 1989

[54] MOTOR VEHICLE REMOTE CONTROL SYSTEM

[76] Inventor: William L. Kelley, 4633 S.W. 31st Dr., Hollywood, Fla. 33023

[21] Appl. No.: 22,724

[22] Filed: Mar. 6, 1987

[51] Int. Cl.$^4$ .............................................. H04Q 9/00
[52] U.S. Cl. ............................ 340/825.060; 340/426; 307/10.6; 180/167
[58] Field of Search ........................... 340/901–904, 340/906, 53, 825.06, 63, 64, 426; 180/167; 455/99; 342/368, 372, 359, 457; 343/711, 713, 714; 358/108; 307/10.1, 10.6

[56] References Cited

U.S. PATENT DOCUMENTS

| | | | |
|---|---|---|---|
| 1,846,032 | 2/1932 | Hart | 340/47 |
| 2,355,607 | 8/1944 | Shepherd | 340/906 |
| 3,112,004 | 11/1963 | Neaville | 180/167 |
| 3,210,726 | 10/1965 | Copsy | 340/902 |
| 3,396,811 | 8/1968 | Bowers et al. | 180/167 |
| 3,580,353 | 5/1968 | Thompson | 180/167 |
| 3,710,122 | 1/1973 | Burcher et al. | 340/825.72 |
| 3,710,313 | 1/1973 | Kimball et al. | 340/902 |
| 3,892,483 | 7/1975 | Saufferer | 340/53 |
| 4,228,419 | 10/1980 | Anderson | 340/906 |
| 4,349,823 | 9/1982 | Tagami et al. | 340/904 |
| 4,386,848 | 6/1983 | Clendenin et al. | 358/108 |
| 4,619,231 | 10/1986 | Stolar et al. | 340/53 |
| 4,660,528 | 4/1987 | Buck | 340/53 |

Primary Examiner—Donald J. Yusko
Assistant Examiner—Edwin C. Holloway, III
Attorney, Agent, or Firm—Herbert L. Lerner; Laurence A. Greenberg

[57] ABSTRACT

Motor vehicle control system for enabling persons in an authorized vehicle to control the movements of one or several general vehicles. The system includes a signal beam transmitter at the authorized vehicle, which can be directed in any direction by beam directing apparatus toward a general vehicle having a beam signal receiver attached thereto. Upon receiving the beam, the general vehicle may be stopped, slowed down or stopped after a certain delay. The beam energy may be laser light, microwave, sound energy or any other suitable energy. The beam transmitter may be combined with a video receiver and a video monitor so that the person in the authorized vehicle can view the general vehicle. The beam may be modulated and encoded with messages that can be decoded in the general vehicle.

1 Claim, 11 Drawing Sheets

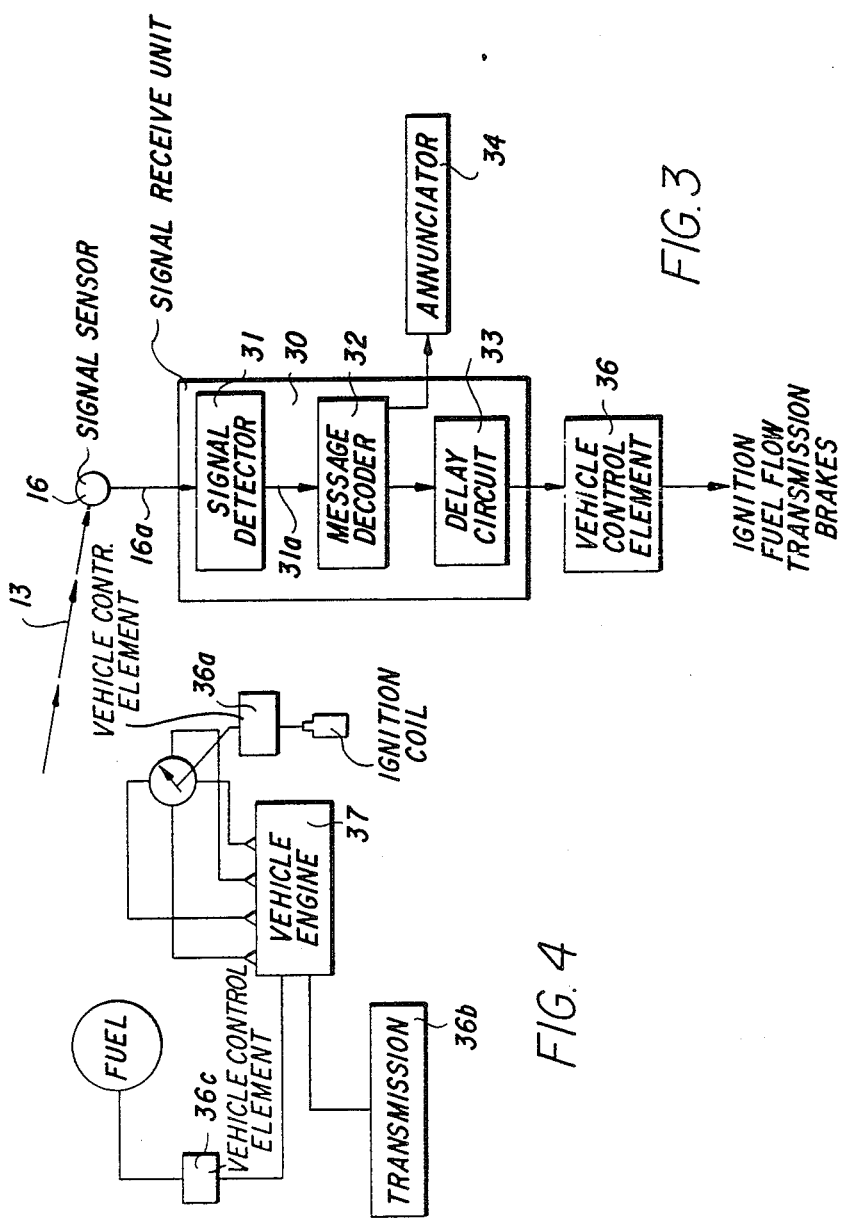

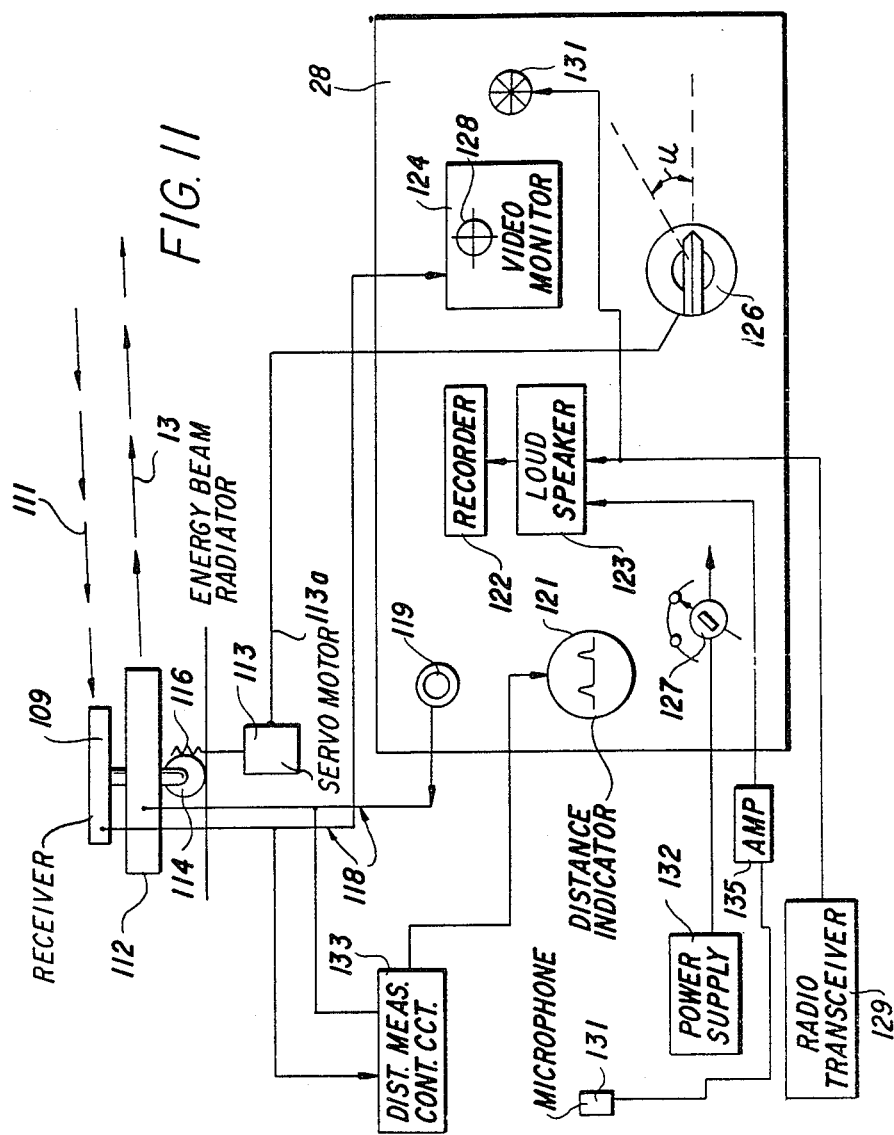

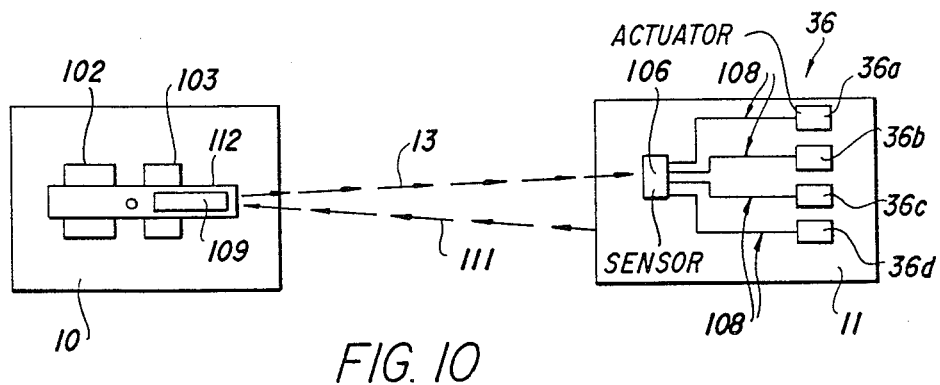
FIG. 10
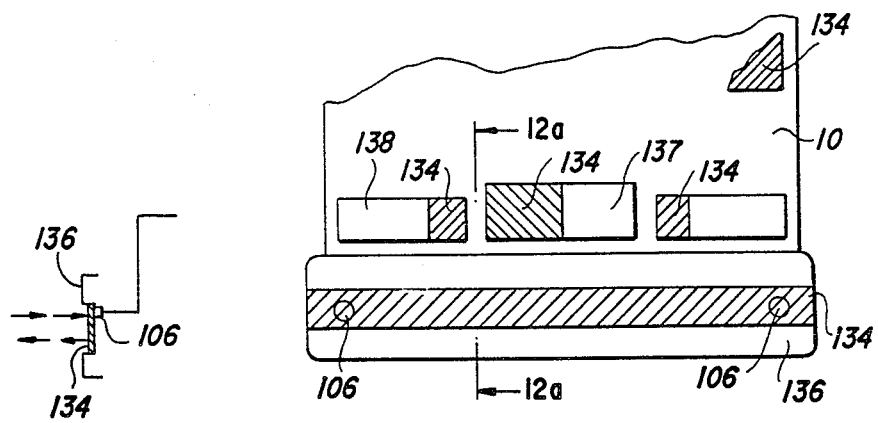
FIG. 12a  FIG. 12
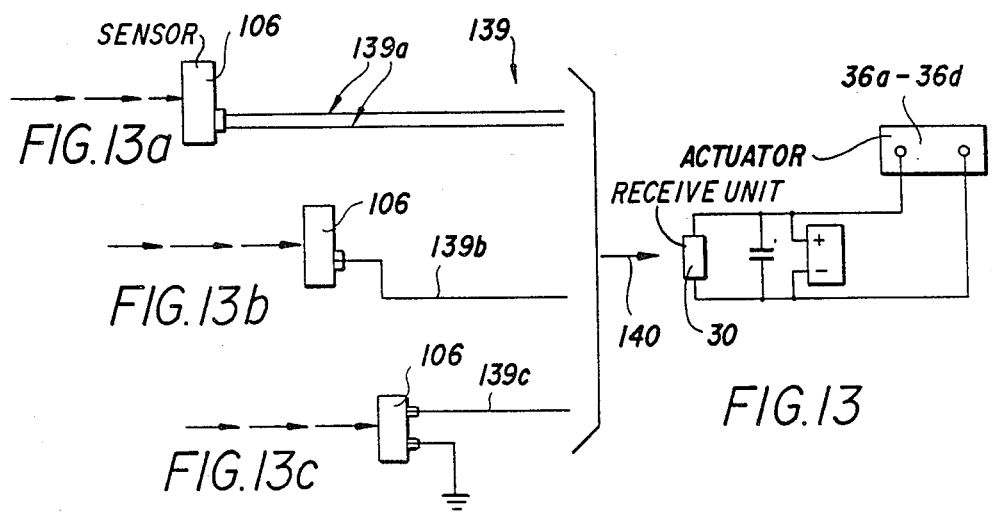
FIG. 13a
FIG. 13b
FIG. 13c
FIG. 13

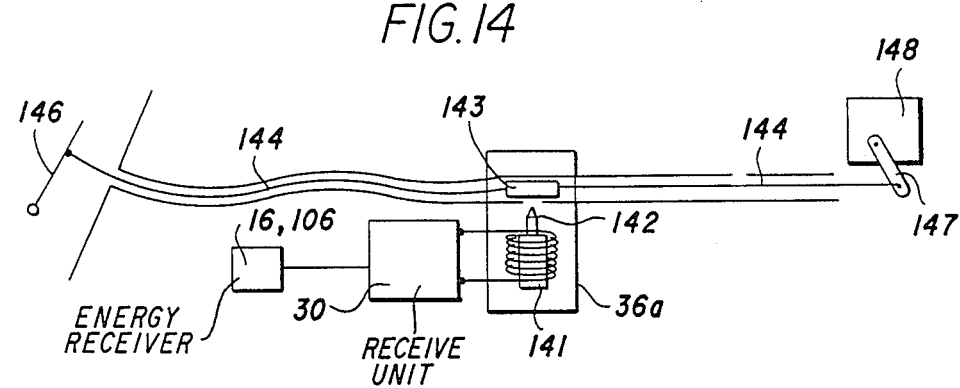
FIG. 14
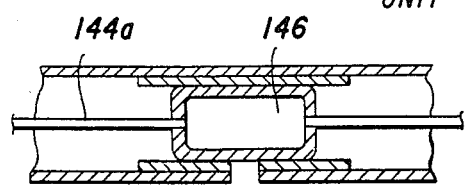
FIG. 15
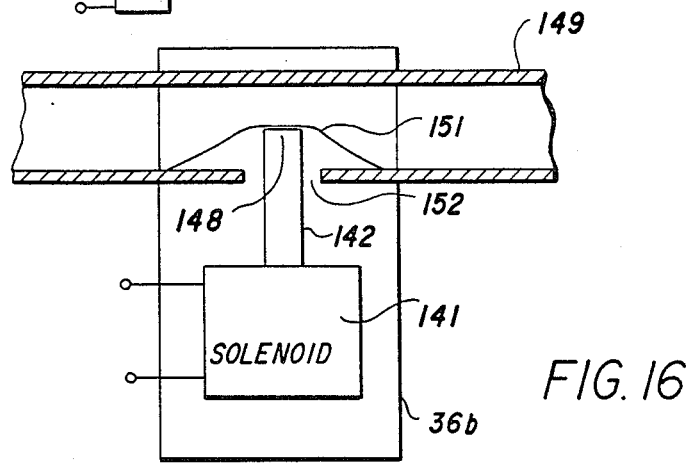
FIG. 16

MOTOR VEHICLE REMOTE CONTROL SYSTEM

BACKGROUND OF THE INVENTION

The invention relates to systems for vehicular traffic control and more particularly to systems for remotely controlling of motor vehicles by means of a directed signal beam.

It is well known that emergency vehicles such as rescue, police and fire vehicles ambulances and increasingly also airborne emergency vehicles, such as police and ambulance helicopters often encounter situations wherein it would be desirable for the driver or pilot of the emergency vehicle to be able to control the movements of other vehicles on the road, for example in order to gain passage through heavily travelled intersections and roadways, or for stopping other vehicles that may interfere with the movement of emergency or other authorized vehicles, or for stopping fleeing vehicles.

PRIOR ART

Stopping devices for vehicles are known that can be installed in a motor vehicle, that are responsive to an external signal and can be coupled to the vehicle's control elements for stopping the vehicle, for example before a railroad crossing. Such a device is shown in U.S. Pat. No. 1,846,032, and consists of a radio receiver coupled to the vehicle's clutch, brake and ignition system.

U.S. Pat. No. 4,209,769 shows a system installed in an automobile which is responsive to an encoded time signal or the like from a rescue vehicle for actively responding to warning signals addressed to the driver of the automobile.

It has been found, however, that the problems encountered by emergency vehicles in gaining passage unencumbered by other traffic remains unresolved. The instant application addresses this problem by means described in more detail in the instant disclosure of the invention. Further, there remains the problem of stopping a fleeing vehicle being pursued by law enforcement vehicles. Such pursuit often causes severe accidents to uninvolved vehicles that happen to be in the path of the pursuit.

It is therefore an object of the invention to provide authorized and emergency vehicles with means for remotely controlling general vehicular traffic surrounding or being in the vicinity of the authorized and the emergency vehicle, by means of a projected signal beam that can be aimed in the direction of a selected single or a group of vehicles that for safety reasons are to be stopped, slowed down or prevented from being started by the signal.

The system according to the invention thereby seeks the primary object of preventing life-threatening situations caused for example by an emergency vehicle traveling at high speed or a law-enforcement vehicle pursuing a fleeing vehicle.

SUMMARY OF THE INVENTION

In its most basic embodiment the instant invention provides that every vehicle on the road as a condition for using the road is equipped with a signal receiver of small compact construction disposed at a suitable location on the vehicle, being connected to one or a combination of the vehicle's control elements, such as ignition, brake, fuel supply or transmission, in order to stop the vehicle when a projected signal suitable to activate the signal receiver is projected toward the vehicle from an emergency vehicle, or any other authorized vehicle.

It is therefore a primary object of the invention to overcome the problems encountered by authorized vehicles in controlling general vehicles described hereinabove.

It is accordingly a feature of the invention to provide a motor vehicle remote control system that enables the driver of an authorized vehicle to control the movements of general vehicles in the vicinity of the authorized vehicle by means that include a signal beam transmitter installed on an authorized vehicle and directing-means in the authorized vehicle in engagement with the signal transmitter for directing the signal beam in any direction from the emergency vehicle, and a signal receiver installed in the general vehicle which is responsive to the signal beam when addressed thereby, vehicle control elements in the general vehicle that are capable of stopping or disabling the general vehicle; and linkage means that are responsive to the signal receiver and are in engagement with the control elements for initiating the disablement of the general vehicle.

In accordance with another feature the means for directing the beam include a control panel in the authorized vehicle which includes dials for directing the beam, a servo motor engaging the transmitter for turning it in any direction in response to the setting of the dials, and a signal generator for generating the directed signal beam energy.

In accordance with a further feature, a signal modulator is provided which in engagement with the signal generator is capable of modulating the signal beam with message information modulated onto the radiated beam.

In accordance with an added feature, the control panel includes a keyboard for entering encoded messages, wherein the control panel is coupled to the signal modulator for modulating such a message onto the beam. The message may be of any desired form and may include a command such as "stop engine", "disconnect fuel supply" or "stop engine after 10 seconds" or the like.

In accordance with an additional feature, the signal receiver in the general vehicle includes a signal detector that produces an output when the signal beam is directed toward the general vehicle, and at least one vehicle control element that is responsive to the outputs of the signal detector for engaging the vehicle to disable it from moving.

In accordance with again another feature, the engine control element may be anyone of or a combination of the engine ignition, the engine fuel supply, the vehicle drive train, and the vehicle transmission or others.

In accordance with again a further feature, a message and address decoder having an input and an output is connected with its input to the signal receiver and with its output to the vehicle control element for decoding the encoded message and executing it.

The encoding and decoding of a message has the further advantage that random ambient noise is prevented from interfering with the receivers and causing random unwanted stopping of vehicles.

In accordance with again an added feature, the vehicle control element is an electrically operated fuel valve inserted in the engine fuel line and being responsive to the signal detector output or the message decoder and address decoder for disconnecting the engine fuel.

In accordance with again an additional feature, the vehicle control element is an electric relay inserted in the electric supply lead for the ignition, having its ignition coil connected to the signal detector output for disconnecting the engine ignition.

In accordance with yet another feature, a delay circuit is interposed between the message decoder and the vehicle control element for providing a selected time delay from receipt of the signal until it execution.

In accordance with yet a further feature, an annunciator is connected to the message decoder for producing an audible or visual signal indication for alerting the driver of the general vehicle to stop or be prepared to stop, or that his vehicle has received an already executed stop command.

In accordance with yet an added feature, the signal beam is a microwave beam, an untrasound beam, a light beam or a laser light beam.

In accordance with a concomitant feature, the receiver is installed in a traffic light for turning the light, for example red, in all directions for a given length of time.

Other features which are considered as characteristic for the invention are set forth in the appended claims.

Although the invention is illustrated and described herein as embodied in a motor vehicle remote control system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 3 is a block diagram of the receiving apparatus in the general vehicle;

FIG. 4 is a block diagram of a vehicle engine having control elements attached thereto;

FIG. 10 is an authorized vehicle having a two-way transmitter;

FIG. 11 shows details of the authorized vehicle's control parts;

FIG. 12 shows a general vehicle having reflective coatings thereon;

FIG. 12a is a sectional detail of FIG. 12, taken along the line 12a—12a, showing a sensor attached to a vehicle bumper;

FIG. 13 and 13a–13c show various electrical connection methods;

FIG. 14–16 shows details of a fuel disconnection arrangement;

DESCRIPTION OF THE PREFERRED EMBODIMENTS

Figure 1:
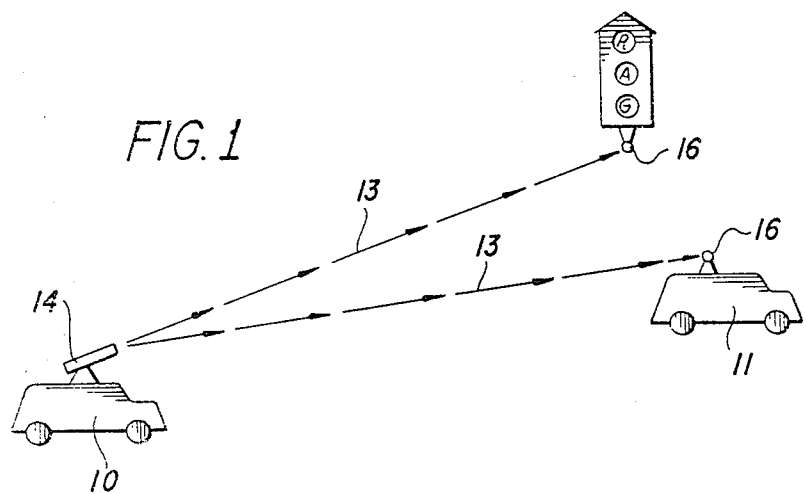
FIG. 1 is a diagrammatic view of an authorized vehicle having a signal transmitter sending a signal beam to a general vehicle or a traffic light.

In the following description of the invention including the drawing, same reference numerals indicate the same elements.

FIGS. 1–7 depict the invention broadly, and the following figures show a number of features and details of the invention.

FIG. 1 shows an authorized vehicle 10 which is typically a police or law-enforcement vehicle, a fire-fighting vehicle or any other vehicle that is driven by personnel authorized to direct the movements of other vehicles, represented by the term "general vehicle" 11 which includes all other vehicles. A signal beam 13 is transmitted from a signal transmitter 14, mounted for example on the roof of the authorized vehicle. The signal transmitter 14 is constructed such that the beam can be directed or rotated in any direction by personnel in the vehicle. The general vehicle 11 is provided with a signal receiver 16, that may typically be installed also on the roof of the vehicle, but can, depending a the type of signal energy used, be installed at any location of the vehicle whereat it can receive the beam 13 from any direction. In other words the receiver 16 is omni directional and the signal transmitter or transmitters if more than one transmitter is provided is selectively directable in any direction, not only in the horizontal plane but also in any vertical plane, so that the beam can be directed, for example toward a traffic light 12, also provided with a signal receiver 16 or other traffic control devices as may be found to be advantageous in furthering the objectives of the invention.

The signal receiver 16, when mounted on a general vehicle 11 may be arranged to immediately stop the vehicle by engaging vehicle control means in the vehicle, connected to the signal receiver, or it may be arranged to stop the vehicle after the elapse of a preset delay built into delay elements in the signal receiver or parts connected thereto. Alternatively, instead of stopping the general vehicle completely, the signal receiver may be arranged to slow-down the movements of the vehicle, i.e., decelerate it and subsequently stop the vehicle after a given preset delay.

The signal receiver 16 built into or connected with the traffic signal 12 may be arranged to alter the signal lights for example to show red light in all directions in order to stop traffic controlled by the traffic signal.

The signal beam(s) 13 may consist of electromagnetic energy, such as light waves, for example laser light due to its highly coherent light and parallel directed light beam, or of radio waves, for example micro waves which are also directable in narrow beams. The signal beam energy may alternatively be acoustic, such as ultrasonic energy that may be directed in narrow beams of sound energy by means of suitable reflectors. It is contemplated that laser light will be one of the preferred forms of beam energy to be used in the invention.

According to a further feature, it is contemplated that the signal beam be modulated by a modulator at a certain suitable frequency which may be steady or encoded to convey one or several encoded messages therein. In that case, a demodulator and a decoder will be included in the receive apparatus.

Figure 2:
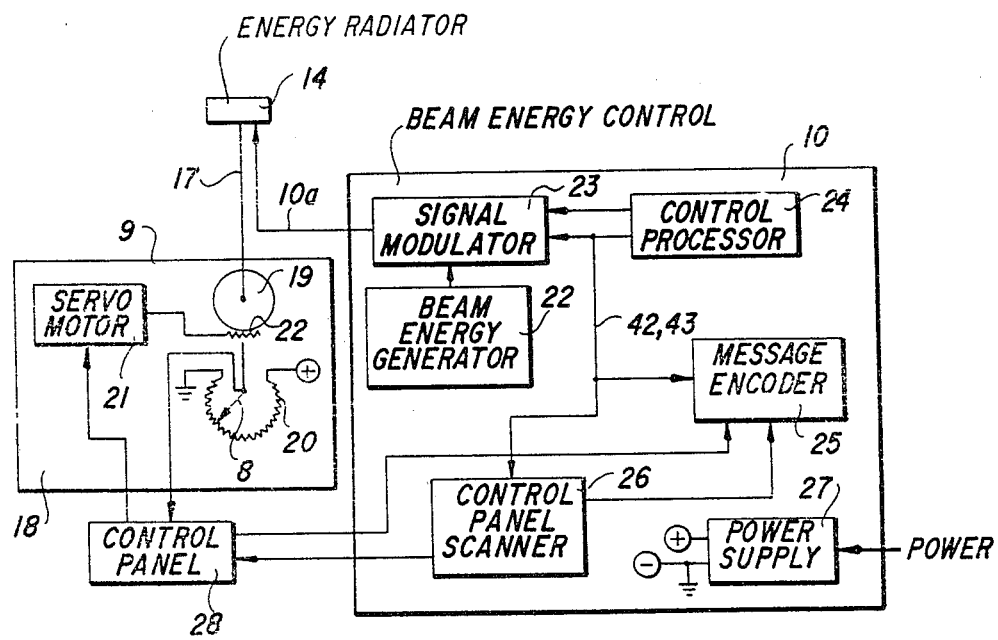
FIG. 2 is a block diagram of the transmitting apparatus in the authorized vehicle.

FIG. 2 shows the signal transmit apparatus in more detail. The signal beam transmitter 14, which is advantageously a laser of any suitable type, is mechanically rotatably controlled by a beam directing unit 9, which includes a vertical rotatable shaft 17, attached to a horizontally oriented gearwheel 19, turnable by a worm gear 19, connected to a servo motor 21, and to the arm 8 of a potentiometer 20. The servomotor 21 controls the direction of the signal beam by turning the worm gear 22, thereby turning the gearwheel 19 with the transmitter 14 to any direction selected by instructions entered by the operating personnel at a control panel 28. The control shaft 17 in engagement with the arm 8 of the potentiometer 20, has its body resistor connected between ground and plus voltage. A voltage which is a function of the direction of the beam is impressed on the potentiometer arm 8, which is connected to a direction indicator 29 (FIG. 5) on the control panel 28.

The beam energy is controlled by a beam energy control unit 10, which includes a beam energy generator 22, generating the exitation energy for the beam transmitter 14, which, in case a laser is used, is a high frequency ac-energy driving the laser. In case the beam energy is micro waves, the energy generator 22 may be a magnetron or clystron or any other suitable microwave energy source. The beam energy, if beam modulation is used, is connected to a signal modulator 23, which impresses suitable modulation on the beam energy. The beam energy is in turn connected to the signal beam transmitter 14 via an energy connection 10a.

In case beam energy modulation is provided in connection with message encoding, a message encoder 25 is connected to the signal modulator 23. The message encoder 25 receives a message or command keyed into the control panel 28 (FIG. 5) by the operating personnel, at the keyboard 32, which is in turn connected to the message encoder 25, which operates to convert the message into serial data form, suitable for driving the modulator 23.

Encoding and modulating an energy beam with a data message is a well known art that has long been known and used. The modulation of the energy may take anyone of several well known forms, such as amplitude modulation, or frequency modulation or pulse modulation, of which there are again several forms, including pulse-code modulation (PCM) or others, which need not be described here in detail, since the invention is not directed to modulation and message encoding per se.

The control panel 28 is scanned continuously by a control panel scanning circuit 26, which in turn engages the message encoder 25. A control processor 24 engages the modulator 23, message encoder 29, and the control panel scanning unit 26, for providing the proper timing, coordination and cooperation of these circuits.

FIG. 3 shows the function blocks of the signal receiving apparatus as installed in a general vehicle or in a traffic signal, for example. When the signal beam 13 is directed at the signal energy receiver 16, an electrical signal is produced by a signal sensor being part of the receiver 16. The sensor may include a photo detector if a light energy beam is used, or a microwave or short wave energy is used. The electrical signal is connected to the signal receive unit 30 via a conductor 16a and is first processed in a signal detector 31. The electrical signal on conductor 16a, includes typically both ambient noise and signal combined, and must be processed in various ways to produce a true signal. This function is performed in the signal detector 31, which typically includes a noise filter to exclude ambient noise above and below certain frequencies. If the beam is modulated, a filter is provided to extract the modulation frequency or frequencies, that are advantageously placed within the voice band range 300–3500 Hz, or within a small part thereof for even better noise rejection. The modulation signal is converted to dc-signal pulses from which noice and extraneous signal components have been removed or suppressed, appearing on the lead 31a, connected to a message decoder 32. The message, when encoded, is typically encoded as a binary signal consisting of one's and zero's, which are in turn encoded into certain bit patterns, each representing a certain message, in conventional encoding forms. Certain types of codes are well known and include for example the ASCII code. Depending upon the encoded message one or several outputs of the signal receive unit 30 may be activated by the decoder 32. A typical message may be "Disable Engine", in which case the engine of the general vehicle will be stopped immediately. Another message may be "Disable engine after a delay", in which case the delay circuit 33 is engaged, and inserts a certain delay before the engine is stopped. The length of the delay can be fixed, e.g. 6 seconds, so that the targeted general vehicle may have time to pull out of the traffic, or the length of the delay can be incorporated into the message. The decoded message is in turn connected to a vehicle control element 36, which is the actual physical element that executes the operation of the message, or a command included therein. Another command would be "disable transmission" which would disconnect the vehicle's drive shaft or linkage, but not stop the engine, so that the targeted vehicle can resume operation, if the disable command is removed. A decoded message may also include a voice or light message addressed to the vehicle driver via an annunciator 34. The operation of the vehicle control element 36 is described in more detail in the following.

FIG. 4 shows diagrammatically a vehicle engine 37 having various control elements 36a–36c, all acting on the engine, wherein 36a is an ignition control contact or relay connected to an "Ignition Control" output from the vehicle control element 36; a transmission disable unit 36b connected to the "Transmission Disable" output; or a fuel control 36c connected to a "Disconnect Fuel Flow" output.

Another output may be "Set Brakes" which may act upon the brakes in a suitable manner to make the vehicle immovable.

It follows that anyone of the above mentioned commands may be executed individually or in any suitable combination.

Figure 5:
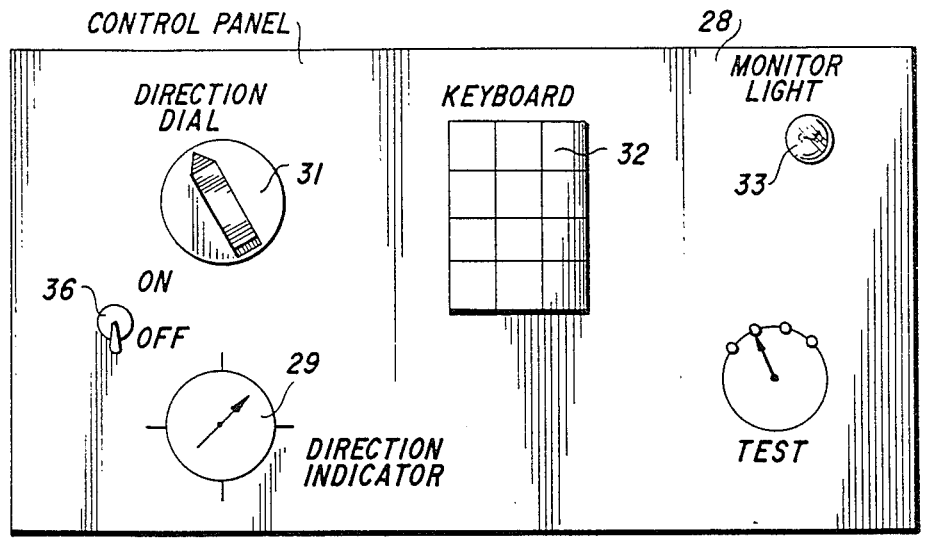
FIG. 5 is a diagram of a control panel showing a directional dial and a keyboard.

FIG. 5 is the control panel 28 in the authorized vehicle, which includes the direction indicator 29, indicating the beam direction, e.g. in relation to the front end of the vehicle; the direction dial 31 which activates the servomotor 21 (FIG. 2) to rotate in either direction, the keyboard 32 which includes pushbuttons for entering messages and commands to be encoded onto the signal beam 13, a monitor light 33, and an on/off switch 36. A test multiposition switch 34 serves to perform certain test functions on the transmitting apparatus, that are monitored by the monitor light 33.

Figure 6:
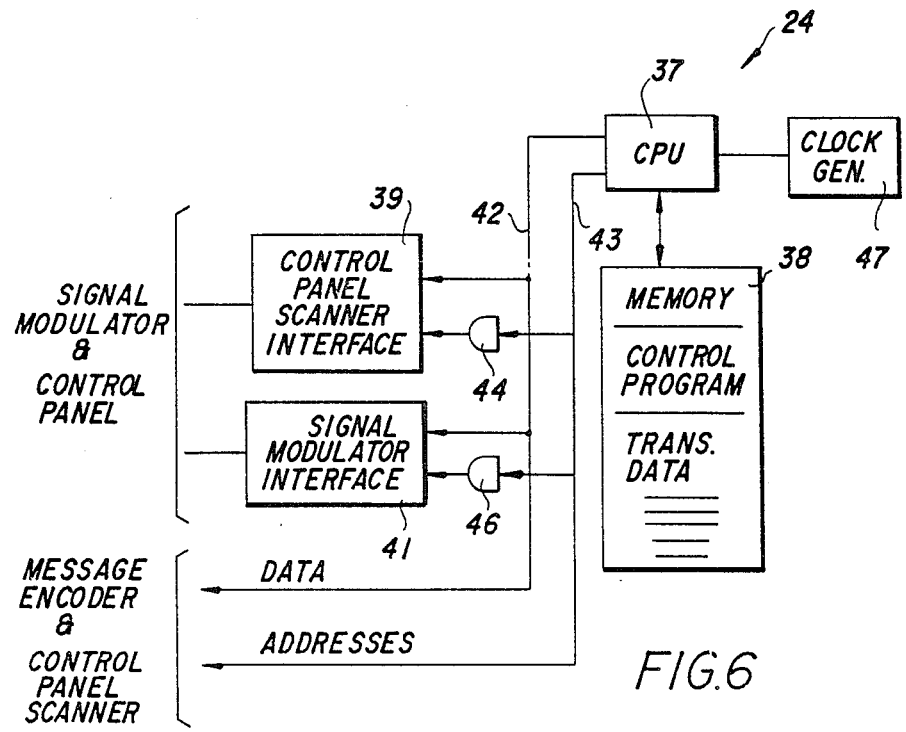
FIG. 6 is a block diagram of the control processor.

FIG. 6 is a block diagram of the control processor 24 of the beam energy control unit 10 (FIG. 2), which includes a central processing unit (CPU) providing overall control, a memory 38 for storing data and control programs, a control bus 42 and an address bus 43 connecting the CPU with a control panel scanner interface 39 and with a signal modulator interface 41 respectively; and with the message encoder 29 and the control panel scanning circuit.

A clock generator 47 provides, in conventional manner, the clock and timing signals for operation of the control processor 24; two address decoding gates 44 and 46 serve to decode the address of the circuits: control panel scanner interface 39 and signal modulator interface 41, respectively.

It follows that the control unit 24 need not be a stored program controller, but may be constructed in other ways, e.g. as a hard-wired controller or the like.

Figure 7:
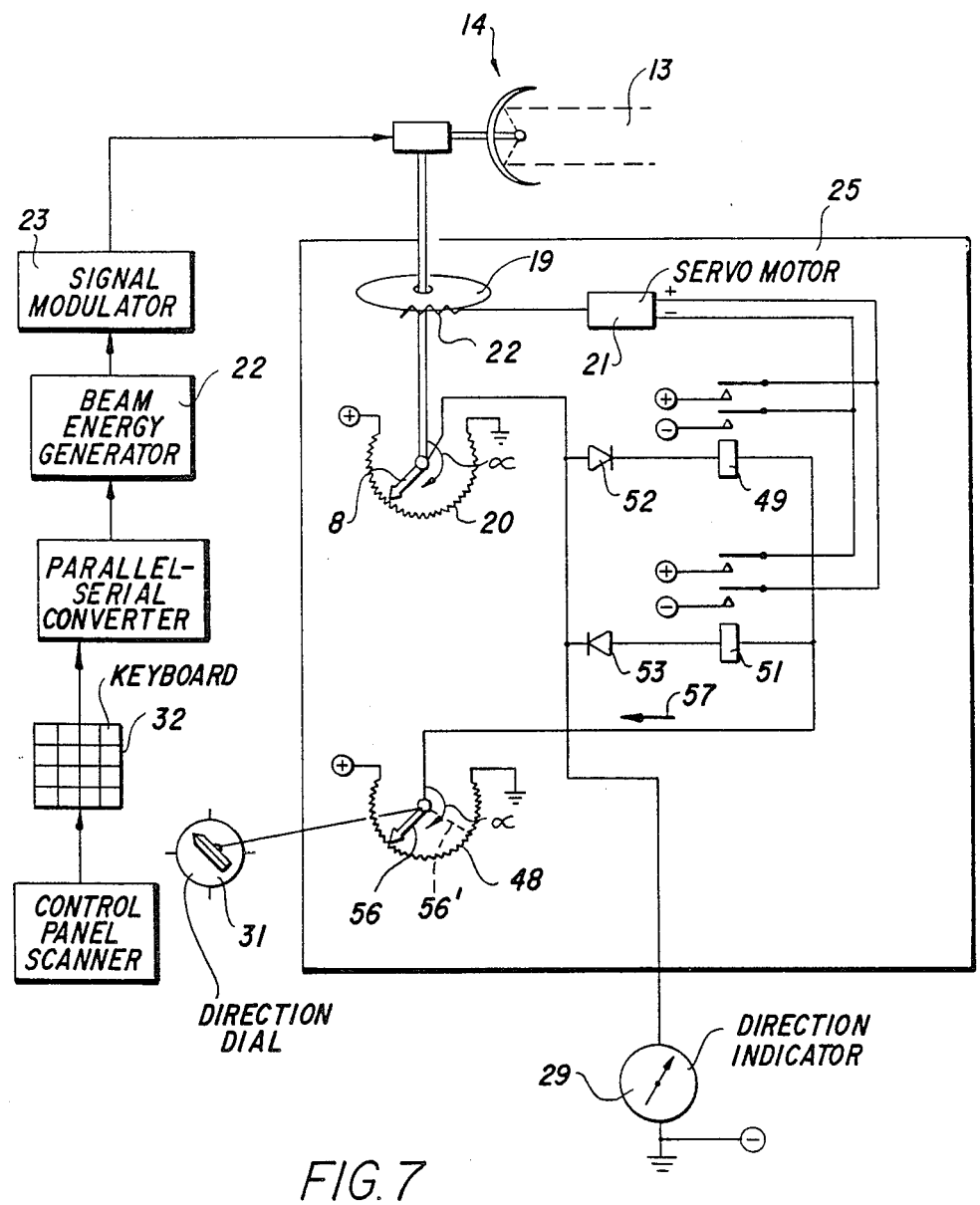
FIG. 7 is a simplified circuit diagram of the directional control of the signal beam radiator.

FIG. 7 shows details of the beam directing unit 25, especially addressing the rotary control of the signal beam transmitter 14 from the control panel 28. As, contemplated, the servomotor 21 is a dc-driven permanent field motor, driven at input terminals + and − in either direction of rotation depending upon the polarity of the dc-drive power. The rotary position of the beam transmitter 14 is impressed by a dc-potential tapped off the potentiometer body 20 and has a magnitude between + and ground potential, according to the rotary position of the arm 8. The direction dial 31 is connected to the arm 56 of a second potentiometer 48, having a body resistor, also connected between + and ground potential. Two-parallel-connected polarity sensitive relays 49 and 51, each in series connection with oppositely facing diodes 52, 53, are connected between the potentiometer arms 8 and 56. In operation, the position of the potentiometer arms are indicated by an angle alpha in relation to a fixed line, as shown in FIG. 7. If the potentiometer arm 56 is set to a position 56' having a smaller angle alpha than the arm 8, the potential on the arm in position 56' will be smaller than on the arm 8, and therefore current will flow in the direction indicated by the arrow 57, through relay 49 and diode 52, but not through relay 51, which has its diode 53 facing against the direction of the current. As a result the contacts of relay 49 will operate and + and − potential is connected to the respective motor terminals + and −, which will turn the worm gear 22 in such a direction of rotation that it will reduce the angle alpha of arm 8, until the potential between the two arms 56 and 8 is identical causing relay 49 to drop and stop the rotation. When the two arm potentials are the same, the arms will be pointing in the same direction; conversely, if the direction dial 31 is turned to increase the angle alpha, the current will flow in the opposite direction, and the other relay 51 will operate, and energize the motor 21 with the opposite polarity, causing it to turn in the opposite direction, causing the arm 54 to move to a greater angle alpha, until the two arms are again pointing in the same direction. The direction indicator 29, which is typically a voltmeter graded in degrees angle is connected between ground, which is equal to − potential, and the arm 54. It therefore serves to indicate the direction of the transmitter 14.

Figure 8:
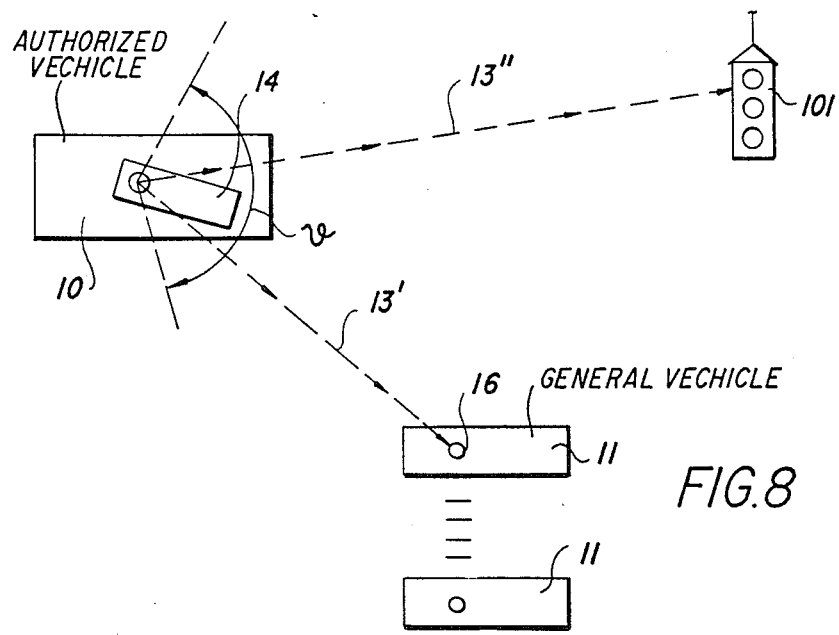
FIG. 8 is a block diagram of an authorized vehicle addressing several targets.
Figure 9:
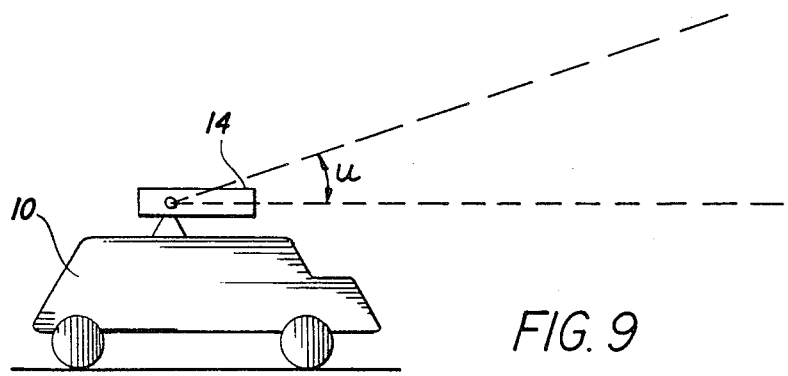
FIG. 9 shows the authorized vehicle having a vertically adjustable signal beam.

FIG. 8 is a top-down view of the authorized vehicle 10 being capable of directing the beam 13' selectively to one of a group general vehicles 11, and to a traffic signal 101 by altering the angle v in the horizontal plane and the angle u in the vertical plane, as seen in the elevational view of FIG. 9.

FIG. 10 and 11 shows an embodiment of the invention capable of showing an image of the general vehicle 11 by utilizing a video camers 109 rigidly mounted atop the radiator 112, which in this embodiment is a subassembly including the laser 102 and/or a microwave generator 103, transmitting a beam 13 consisting of laser light or microwave energy directed at the general vehicle or target 11 which returns a reflected light 111 of the vehicle or target 11. The video camera 109 is connected to a video monitor 124 mounted on the control panel 28 via wiring 118, and shows an image of the target to which the beam 13 is directed. The video screen may have a cross-hair 128 to aid the operator of the authorized vehicle in aiming the beam 13 at a particular target or vehicle, using the servomotor 113 connected to the gear assembly 116 and 114, as described in more detail hereinabove. The pushbutton or pushbuttons 119 serve(s) to activate the laser and or microwave beam 13 when the cross-hairs 128 is pointed directly at the target. Upon activation, the beam 13 hits the receiver 106 in the target or general vehicle 11, which includes at least one of the activators 36a–36b which operate to activate various associated engine elements to disable the engine, or the vehicle.

The control panel 28 may further include a loudspeaker 123 connected to a police band radio transceiver 129, and a tape recorder 122 for recording sound and voice from the transceiver 129. A direction dial 126 serves to control the vertical elevation angle u of the radiator assembly 112 by means of the motor and gear assembly 113, 116 and 114. The loudspeaker 123 may also be used to listen to the sound from the vehicle being pursued by means of a microphone 131 attached externally to the authorized vehicle 10, connected through a suitable amplifier 135 to the loudspeaker 123. A beeper 131 is connected to the radio transceiver 129 to produce a beep when the target has been hit by the laser beam. A safety key switch 127 serves to turn the power to the laser apparatus from the power supply 132 on or off by means of a key. The video camera 109 may advantageously be of the type that is sensitive to infrared light so that the target can be seen also in the dark.

A distance indicator 121 in the form of a cathode ray tube connected with a distance measuring control circuit 133 of conventional construction serves to measure and show the distance to a target being pursued, by means of the laser and video camera receive assembly 112, 109.

FIG. 12 shows details of a general vehicle or target 10 having reflective surfaces or coatings 134 attached to various body parts, e.g. the pumper 136, the rear lights 138 and/or the license plate 137 and other body parts. The reflective surfaces serve to reflect infrared light to make the vehicle more visible to the video camera 109. The infrared - reflective surfaces 134 may be combined with the laser light sensors 106 connected to the actuators 36a–36c (FIG. 4).

FIG. 13 shows the sensors 106 connected by various connecting means 139a–c to the signal detector 30. The connecting means 139 are configured in FIG. 13a as balanced electric wires 139a having two wires, in FIG. 13b as a fiber-optic wire 139b and in FIG. 139c as a single wire having ground return, via the vehicle metal frame, indicated by a ground symbol. The connection 140 between the sensors 106 and the receive unit 30 may alternatively be a wireless connection, e.g. infrared, microwave or the like.

FIGS. 14–24 shows various embodiments of the actuators 36, as they are connected with and operate on various vehicle control elements to stop or slow down the vehicle.

FIG. 14 shows the actuator 36a including a solenoid 141 connected via the receive unit 30 to the signal energy sensor 106 or the energy receiver 16, which upon actuation operates a plunger 142 engaging a disconnect element 143 inserted in the cable or linkage 144 between the accelerator pedal 146 and the control arm 147 of the carburetor or fuel injector 148. The disconnect element 143 is seen in more detail in FIG. 15, which shows a capsule 146 containing gas under pressure or a small explosive charge. When the plunger 142 hits the capsule 146 with a sharp edge 147 which causes the capsule 146 to disintegrate or shatter, it separates the cable 144 into two disconnected parts 144a and 144b, thereby preventing the vehicle from moving at any but a very slow idling speed.

FIG. 16 shows an actuator 36b, having a solenoid 141 with plunger 142 having a blunt end 148 engaging a flexible membrane 151, covering an aperture 152 in the wall of the fuel line 149. Upon actuation, the plunger 142 deforms the membrane 151 to block fuel flow to the engine.

Figure 17:
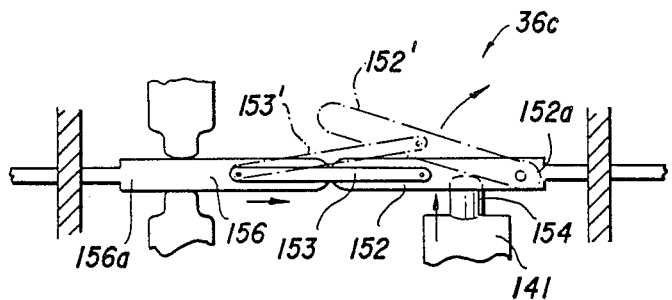
FIG. 17 is a transmission or carburetor linkage disconnect arrangement.

FIG. 17 shows an actuator 36c having a toggle link 152 pivotally connected to a connecting link 153, which is in turn pivotally connected to a push link 156; and a solenoid 141 having a plunger 154 in engagement with the toggle link 152. Upon operation, the plunger 154 extends and moves the toggle link 152 to position 152', shown in dashed lines, so that the distal ends 152a and 156a of the toggle link 152 and the push link 156 respectively are pulled closer together. The ends 152a and 156a are connected in the linkage controlling the timing of the engine ignition or the fuel flow so that the timing gets very late, thereby preventing the engine from producing enough power for a quick getaway or stopping the engine completely.

Figure 18:
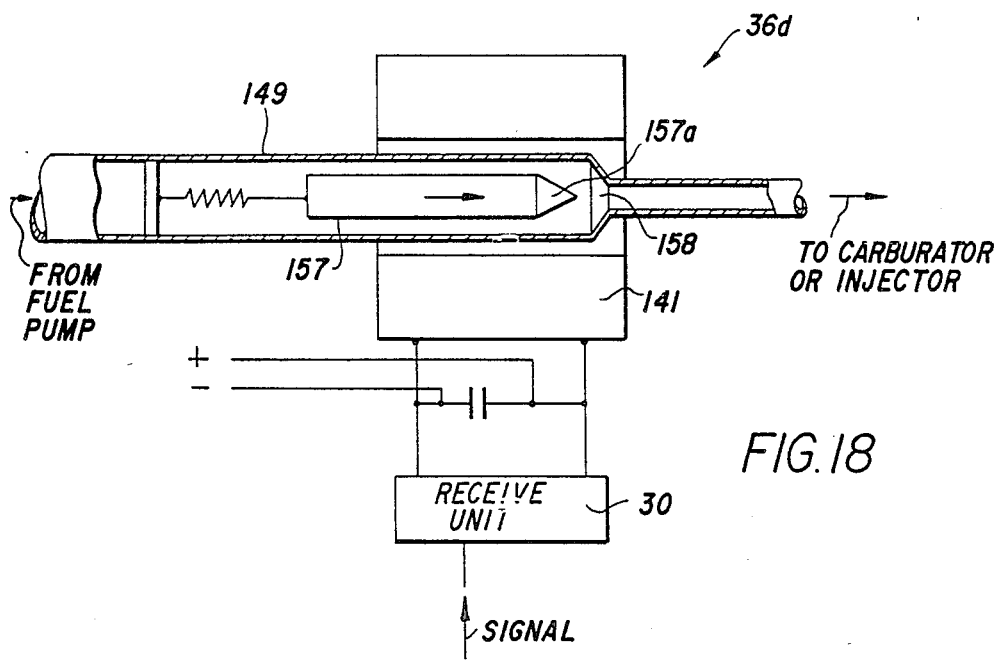
FIG. 18 shows details of a fuel line with a disconnect element or valve.

FIG. 18 is an actuator 36d having a needle valve plunger 157 having a conical tip end 157a normally spaced apart from a valve seat 158, positioned inside the fuel line 149 between the fuel pump and the carburetor or the fuel injector. A solenoid 141 surrounds the needle valve plunger 157, so that upon activation, the plunger 157 is drawn with its conical tip 157a into engagement with seat 158, thereby shutting off the fuel flow to the engine.

Figure 19:
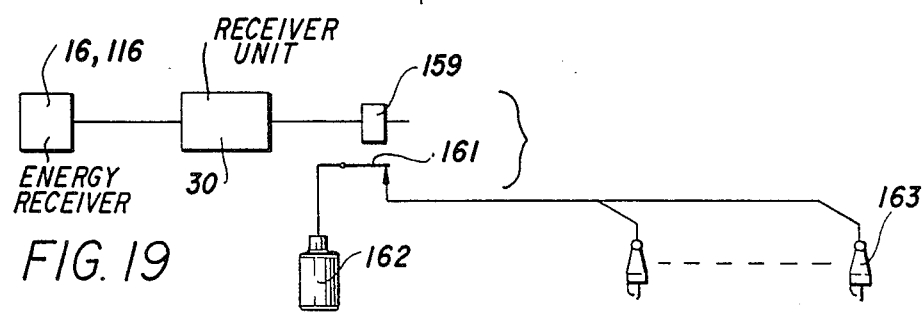
FIG. 19 shows an ignition disconnect arrangement.

FIG. 19 shows an engine disabling system wherein the receive unit 30 is connected to a relay 159 having a break contact 161 inserted in the connection between the ignition coil 162 and the sparkplugs 163. Upon activation, the break contact 161 opens the connection and stops the engine.

Figure 20:
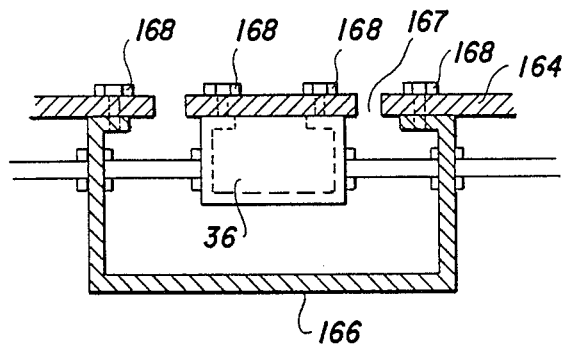
FIG. 20 and 21 shows disconnect elements in a housing, mounted or the engine block traversed by cooling fluid, and or disconnect elements mounted on the engine block in a key-locked box.

FIG. 20 is an arrangement for placing the activator 36 bolted to the wall 164 of the target vehicle engine block, housed in a housing 166 also bolted to the wall of the engine block, allowing cooling water from the engine to fill the housing from holes 167 in the wall. This arrangement serves to prevent a person having a general vehicle from accessing the actuator for the purpose of deactivating it in an unauthorized manner to defeat the purpose of the invention. The bolts 168 holding the housing 166 and the actuator 36 attached to the engine block are advantageously placed with their heads on the inside of the engine block wall 166, to make it still more difficult to reach the activator 36.

Figure 21:
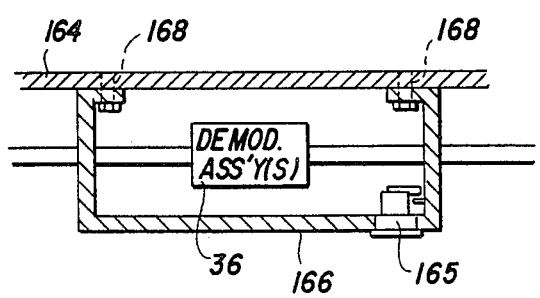

FIG. 21 is an arrangement similar to that seen in FIG. 20, with the difference that the housing 166 with the activator 36 is placed inside the engine block, or it may be attached to the outside, secured by a keylock 165, making it still more unaccessable.

Figure 22:
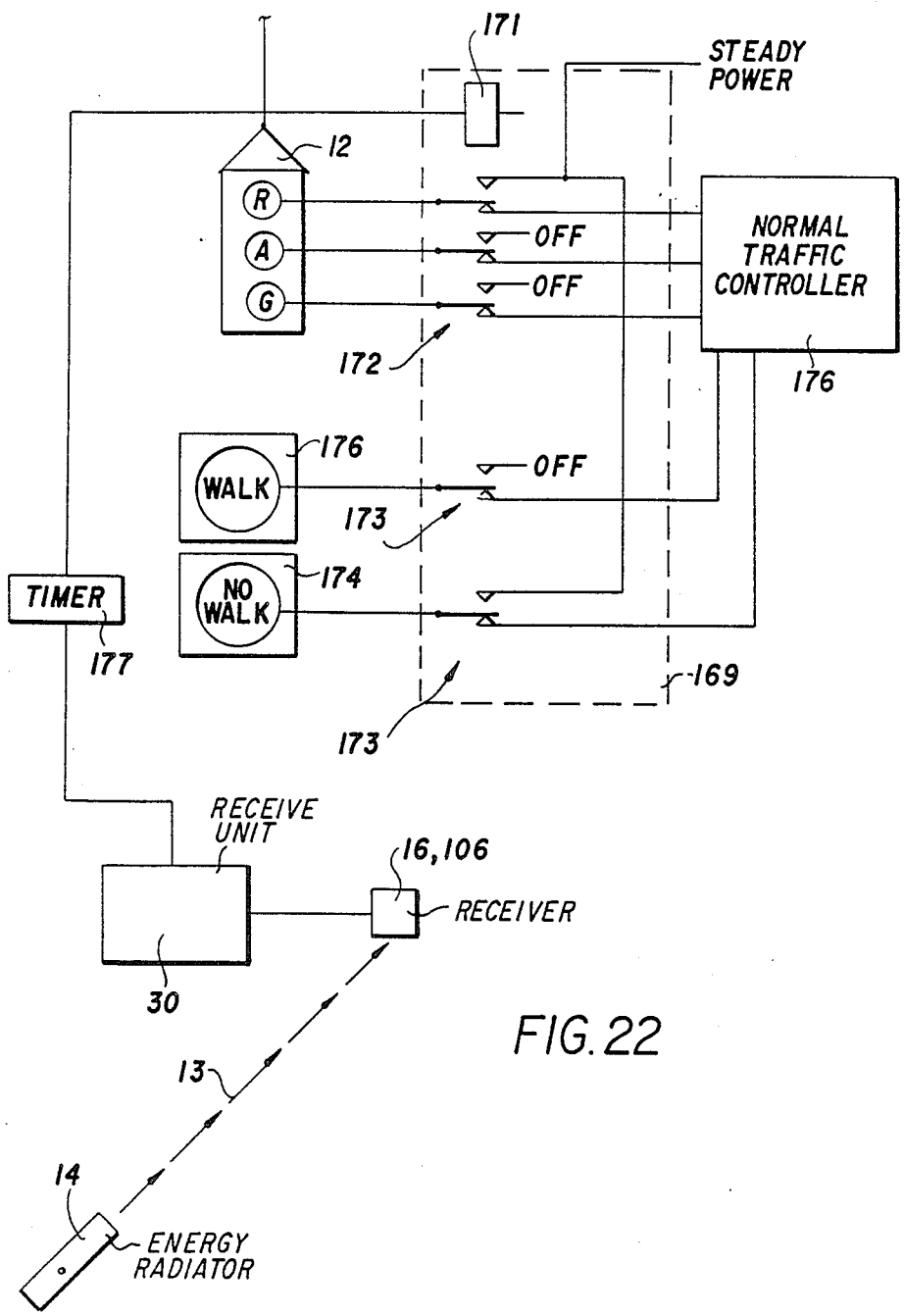
FIG. 22 shows details of a traffic light control system.

FIG. 22 is a schematic wiring diagram showing the operation of a traffic light 12 which, by means of the radiated beam 13 may be directed to the receiver 16,106 by the transmitter 14. The receive unit 30 upon receiving the signal from the receiver 16 or 106 activates a relay 171 through a timer 177 having at least one switch assembly 172 connecting the lights of the signal (Red, Amber and Green) through normally closed break contacts to a normal traffic controller 176, that cycles the light through their normal cycles. Upon actuation, the relay 171 operates and transfers the red light through a make contact to a steady power source while the amber and green lights go off, and stay in that condition for a set period of time, determined by the timer 177, after which the relay is again restored to normal.

Other lights, such as "walk" and "no walk" can be operated through relay switches 173. Upon operation of the relay 171, the "walk" light goes off, and the "no walk" light goes steady on.

I claim:

1. Motor vehicle remote control system for enabling an authorized vehicle to control the movements of at least one general vehicle having drive control elements, comprising: a signal beam transmitter disposed on top of the authorized vehicle; means for directing said signal beam; a signal receiver attached to said general vehicle for receiving said signal beam; vehicle control means disposed in said general vehicle being responsive to said signal receiver, connected to said general vehicle's drive control elements for controlling the movements of said general vehicle; wherein said signal beam contains energy from one of: electromagnetic wave energy, and acoustic energy; said movements of the general vehicle is at least one of: decelerating the general vehicle, stopping the general vehicle, and stopping the general vehicle after a delay; including a transmission disengage element for disengaging the engine from the general vehicle's drive wheels; including a fuel disengage element and wherein said transmission disengage element is disposed in a housing structurally connected to the engine cooling system and being traversed by cooling liquid, for preventing unauthorized tampering with at least one of the transmission and the fuel disengage element.

* * * * *